(12) United States Patent
Green

(10) Patent No.: US 7,265,503 B2
(45) Date of Patent: Sep. 4, 2007

(54) APPLICATIONS OF HALOGEN CONVERTOR CONTROL IC

(75) Inventor: Peter Green, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 172 days.

(21) Appl. No.: 11/102,101

(22) Filed: Apr. 8, 2005

(65) Prior Publication Data

US 2005/0225257 A1 Oct. 13, 2005

Related U.S. Application Data

(60) Provisional application No. 60/561,074, filed on Apr. 8, 2004.

(51) Int. Cl.
*G05F 1/00* (2006.01)
(52) U.S. Cl. .................. 315/308; 315/209 R; 315/291
(58) Field of Classification Search ............ 315/209 R, 315/224, 244, 291, 292, 297, 307, 308, 312, 315/316, 324
See application file for complete search history.

(56) References Cited

U.S. PATENT DOCUMENTS

| | | | | |
|---|---|---|---|---|
| 5,491,388 | A * | 2/1996 | Nobuyuki et al. | 315/308 |
| 6,963,176 | B2 * | 11/2005 | Onishi et al. | 315/291 |
| 2004/0012346 | A1 * | 1/2004 | Green et al. | 315/291 |
| 2004/0135523 | A1 * | 7/2004 | Takahashi et al. | 315/291 |
| 2004/0212318 | A1 * | 10/2004 | Hamamoto et al. | 315/200 R |
| 2005/0218839 | A1 * | 10/2005 | Ribarich | 315/307 |
| 2006/0158131 | A1 * | 7/2006 | Mitsuyasu et al. | 315/209 R |

\* cited by examiner

*Primary Examiner*—Trinh Dinh
*Assistant Examiner*—Tung Le
(74) *Attorney, Agent, or Firm*—Ostrolenk, Faber, Gerb & Soffen, LLP

(57) ABSTRACT

The functionality of electronic convertors for low voltage filament lamp applications, such as halogen lamps, can be increased by including auxiliary circuits. Such auxiliary circuits may include gate drive resistors; a charge pump for sustaining the DC supply; open circuit protection; short circuit protection; thermal protection; extended resetting time; latched shutdown; self-dimming; a digital (DALI) interface; and line voltage compensation.

21 Claims, 12 Drawing Sheets

APPLICATIONS OF HALOGEN CONVERTOR CONTROL IC

CROSS-REFERENCE TO RELATED APPLICATIONS

This application is based upon and claims priority of U.S. Provisional Ser. No. 60/561,074 filed Apr. 8, 2004, by the present inventor and titled DIMMABLE ELECTRONIC CONVERTOR FOR LOW VOLTAGE LIGHTING, incorporated by reference. This application is also based upon and claims priority of U.S. Provisional Ser. No. 60/602,245 filed Aug. 17, 2004, by the present inventor and titled DIMMING CONVERTER FOR HALOGEN USING PWM INTERNAL CONTROL OF BALLAST CHIP, incorporated by reference.

This application is related to Ser. No. 10/443,525 filed May 21, 2003, by Peter Green and Iulia Rusu, titled BASIC HALOGEN CONVERTOR IC, and Ser. No. 11/062,010 filed Feb. 18, 2005 by Iulia Rusu, Dana Wilhelm and Peter Green, titled HALF-BRIDGE ADAPTIVE DEADTIME CIRCUIT AND METHOD, also incorporated by reference.

BACKGROUND OF THE INVENTION

1. Field of the Invention

The present invention relates to electronic convertors for low voltage filament lamp applications such as halogen lamps, and more particularly to auxiliary circuits for adding increased functionality to such convertors.

2. Related Art

Until now, almost all electronic convertors (often called electronic transformers) for low voltage filament lamp applications have up to now been based around self-resonating bipolar transistor half-bridge circuits. A new approach, using power MOSFETs driven by a control IC incorporating additional functionality tailored to this application, is realized in the IR2161 control IC and demonstrated in a typical application described herein.

The IR2161 is a dedicated intelligent half bridge driver IC for a halogen convertor (the word "convertor" being spelled in accordance with standard IEC 61047 "DC or AC supplied convertors for filament lamps—Performance requirements") or "electronic transformer" targeted at medium and high end performance low voltage lighting applications. Considerable functionality has been incorporated within a low cost 8 pin DIP or SOIC package to allow reliability and performance advantages over existing circuit designs with a lower component count.

Electronic transformers are commonly used in place of wire wound step down transformers in order to provide the correct supply for widely used low voltage (generally 12V) filament lamps such as dichroic halogen lamps. Advantages are: (1) small size and weight, (2) fault protection circuitry, and (3) safety because of low output voltage.

Electronic transformers have become popular for low voltage lighting applications. The range of available products ranges from very small 50 W units, capable of driving only a single 50 W lamp, to 300 W units capable of driving up to 6×50 W lamps. In many applications the lamps are attached to a track system in which the supply rails are exposed. Since the voltage is only approximately 12V this does not present any safety problem.

The electronic transformer is generally smaller and lighter than a wire wound equivalent and may be equipped with short circuit and thermal protection, which are generally not included when a wire wound transformer is used. Generally a well-designed electronic transformer may be dimmed with a triac based leading edge phase cut dimmer (as can a wire wound transformer) or by a trailing edge transistor dimmer.

A block diagram of the IR2161 is shown in FIG. 1 and a typical application is shown in FIG. 2. These circuits have already been described in the above-mentioned Ser. No. 10/443,525 so that only a brief description need be presented here.

Referring to FIGS. 1 and 2, the IR2161 IC includes both oscillator and shut-down circuitry, including an additional thermal shut-down avoiding the need for external thermistors.

The IR2161 provides low and high side output drives HO and LO for the half-bridge MOSFETs or IGBTs M1 and M2. The output from the half bridge is connected to a high frequency stepdown transformer, which supplies approximately 12 Vrms at the output to drive the lamps. The IR2161 also incorporates all of the protection features needed in the system without the need for many external components.

At switch-on, the frequency sweeps from a high frequency around 125 kHz down to the normal operating frequency 30 to 40 kHz over a period of approximately 1 second. Because of the leakage inductance in the transformer this causes the output voltage at the lamp to start at a reduced value and gradually increase to the 12V nominal level. This reduces the inrush current at switch on. When the lamp is cold the filament resistance is lower which tends to cause high inrush currents that can cause false tripping of the shutdown circuit.

The IC includes a short circuit protection that operates if a high current is detected for approximately 50 msec causing the outputs to switch off. Similarly if an >50% overload is detected for more than approximately 500 msec then the outputs will switch off. It should be noted that the shutdown time under an overload condition will be reduced depending on the magnitude of the overload.

This dual mode shutdown circuit will protect the circuit from all output fault conditions and will function when the convertor is dimmed, and it will also protect the system from a short circuit at the end of the output leads.

An electronic transformer is normally required to provide a reasonably consistent output voltage over a range of loads and so the IC senses the load through the current sense resistor RCS and increases the frequency as the load is reduced thus providing compensation for the output transformer load regulation. There is also some modulation of the frequency through the line voltage half-cycle to spread the harmonics and reduce the size and cost of the EMC filtering components required.

The IR2161 includes all necessary protection features and also allows the convertor to be dimmed externally with a standard phase cut dimmer for leading or trailing edge. This IC provides the advantage of longer lamp life due to soft start and output voltage shift (load regulation) compensation. It causes the convertor to run with optimized harmonic behavior (i.e. almost unity power factor) also at higher loads (solution with bipolar devices can have harmonics problems for high loads due to the fact that the oscillator start-stop every half cycle, causing cross over distortion).

The IC also includes adaptive dead time to realize soft-switching and allow cool running MOSFETs (and improves the EMI behavior due to frequency modulation during the line voltage half cycle).

Some points to consider when comparing a halogen convertor circuit design with an electronic ballast for fluorescent lamps:

Filament Lamp is a Resistive Load
No Preheat/Ignition is required
DC Bus is full wave rectified line without smoothing
Close to Unity Power Factor is inherent in system
Can be dimmed with Triac (standard domestic type) dimmer
Dimming is achieved by PHASE CUTTING of the AC line
Output is isolated Low Voltage
Protection is provided against output short circuit or overload.
Shutdown is Auto-Resetting The protection circuitry is auto-resetting so that if the output is short circuited the system will periodically try to restart and then shut down again. When the short-circuit is removed the lamp will be able to come back on again without the need for cycling the AC supply off and back on again to reset.

Of particular interest is the external capacitor at the CSD pin, which is used in several different operating modes, allowing the IC to be limited to 8 pins. The CSD pin is connected to different circuit blocks during different modes, controlled by internal control logic.

The current sense (CS) input is connected to the voltage compensation and shutdown circuit blocks. The CSD capacitor is switched between different circuits through internal transmission gates. The oscillator is voltage controlled and its input is connected to the CSD capacitor during normal operation. In case of overtemperature or external shutdown, the IC will go into a fault mode. In this mode the IC is in latched shutdown and will restart only after resetting the mains. In case of overvoltage or overload, the IC will go into an auto-resetting fault.

The different modes of operation of the IC and the system implications are shown in the state diagram of FIG. 3. FIG. 3 is a state diagram presenting the various operating modes of the IR2161, namely the UVLO mode, soft start mode, run mode, fault timing mode, fault mode, shut-down mode and standby mode. These operating modes are described further in Ser. No. 10/443,525.

Supplying VCC to the IR2161

The under-voltage lockout mode (UVLO) is defined as the state the IC is in when VCC is below the turn-on threshold of the IC. The IR2161 under voltage lock-out is designed to maintain an ultra low supply current under 300 µA and to guarantee the IC is fully functional before the high and low side output drivers are activated.

The capacitor (CVCC) is charged by current through supply resistor (RS) minus the start-up current drawn by the IC. This resistor charges CVCC to the UVLO+ threshold, at which point the IR2161 starts to operate and the LO and HO outputs become active. In a halogen convertor it is important to consider that the DC bus is completely unsmoothed and has a full wave rectified shape. CVCC should be large enough to hold the voltage at VCC above the UVLO threshold for one half cycle of the line voltage as it will only be charged at the peak.

An external 16V zener diode VZ has been added to avoid the need for the internal zener to dissipate power (it should be rated at 1.3 W). The resistor RD in series with CD enables the convertor to operate from a triac based (leading edge) phase cut dimmer. When the triac fires at a point during the mains half-cycle the high dv/dt allows a large current to flow through this path to rapidly charge CVCC to the maximum VCC voltage. In this way each line half cycle, the system will receive a fast pull up on VCC when the traic in the dimmer is fired. The external zener VZ will prevent possible damage to the IC by shunting excess current to COM. Once the capacitor voltage on VCC reaches the start-up threshold the IC turns on and HO and LO begin to oscillate.

A bootstrap diode (DB) and supply capacitor (CB) comprise the supply voltage for the high side driver circuitry. To guarantee that the high-side supply is charged up before the first pulse on pin HO, the first pulse from the output drivers comes from the LO pin. During under voltage lock-out mode, the high and low-side driver outputs HO and LO are both low.

Soft Start Operation

The soft start mode is defined as the state the IC is in at switch on of the system when the lamp filament is cold. As with any type of filament lamp the dichroic halogen lamp has a positive temperature coefficient of resistance such that the cold resistance (at switch on when the lamp has been off long enough to cool) is much lower than the hot resistance when the lamp is running. This normally results in a high inrush current occurring at switch on. Under worst-case conditions this could potentially trigger the shut down circuit. To overcome this problem the IR2161 incorporates the soft start function, shown schematically in FIG. 4.

When the IC starts oscillating the frequency is initially very high (about 125 kHz). This causes the output voltage of the convertor to be lower since the HF transformer in the system has a fixed primary leakage inductance that will present a higher impedance at higher frequency allowing less AC voltage to appear across the primary. The reduced output voltage will naturally result in a reduced current in the lamp which eases the inrush current, thus avoiding tripping of the shutdown circuit and easing stress on the lamp filament as well as high current in the half bridge MOSFETs (M1 and M2).

The frequency sweeps down gradually from 125 kHz to the minimum frequency over a period of around 1s (for a CSD capacitor of 100 nF). During this time the external capacitor at the CSD pin charges from 0V to 5V controlling the oscillator frequency via the internal voltage controlled oscillator (VCO). The value of CSD will determine the duration of the soft start sweep. However since it also governs the shut down circuit delays the value should be kept at 100 nF to achieve the correct operation.

Run Mode

When soft start is completed the system switches over to run mode. During this time the system provides some regulation of the output voltage of the convertor from minimum to maximum load. In this type of system it is desirable that the voltage supplied to the lamp does not exceed a particular limit. If the lamp voltage becomes too high the temperature of the filament runs too high and the life of the lamp is significantly reduced. The problem is that the output transformer is never perfectly coupled so there will always be a degree of load regulation. The transformer has to be designed such that the lamp voltage at maximum load is sufficiently high to ensure adequate light output.

At minimum load the voltage will consequently be higher and is likely to exceed the maximum desired lamp voltage. The load current is sensed via the current sense resistor (RCS). The peak current is detected and amplified within the IC then appears at the CSD pin during voltage compensation mode. The voltage across the CSD capacitor will vary from 0V if there is no load to approximately 5V at maximum load.

This is provided that the correct value of current sense resistor has been selected for the maximum rated load and line voltage supply of the convertor. This should be 0.33 Ohm (0.5 W) for a 100 W system running from a 220-240 VAC line. (It should be noted that the RCS resistor value sets the limits for the shut down circuit.)

In run mode the oscillator frequency will vary from approximately 30 kHz when VCSD is 5V (maximum load) to around 60 kHz when VCSD is 0V (no load). The result of this is that at lighter loads, for example if only a single 35 W lamp is connected to a 100 W convertor, the frequency will shift upwards so that the output voltage falls below the maximum that is acceptable for the lamp. This provides sufficient compensation for the load to ensure that the lamp voltage will always be within acceptable limits but does not require a complicated and expensive system involving feedback from the output.

An additional internal current source has been included to discharge the external capacitor. This will provide about 10% ripple at twice the line frequency if CSD is 100 nF. See FIG. 5.

The advantage of this frequency modulation (or "dither") is that during the line voltage half cycle the oscillator frequency will vary by several kHz, thus spreading the EM conducted and radiated emissions over a range of frequency and avoiding high amplitude peaks at certain frequencies. In this way the filter components used may be similar to those used in a common bipolar self-oscillating system.

FIGS. 6A and 6B show the VCO frequency ranges as a function of temperature in running mode and in soft start mode, respectively. Frequency variations over temperature have been minimized. Acceptable linearity exists in run mode, whereas in soft start mode it is not needed. Minimum frequencies are the same in two modes.

Shut Down Operation

The IR2161 contains a dual mode auto-resetting shut-down circuit (FIG. 7) that detects either a short circuit or overload condition at the output. The load current detected at the CS pin is used to sense these conditions. If the output of the convertor is short-circuited, a very high current will flow in the half bridge and the system must shut down within a few mains half cycles otherwise the MOSFETs will rapidly be destroyed due to excessive die temperature. The CS pin has an internal threshold of approximately 1.0V so that if the voltage exceeds this level for more than 50 msec the system will shut down.

A delay is included to prevent false tripping either due to lamp inrush current at switch on (this current is still higher than normal with the soft start operation) or transient currents that may occur if an external triac based phase cut dimmer is being used.

There is also a lower threshold of 0.5V, which has a much longer delay before it shuts down the system. This provides the overload protection if an excessive number of lamps is connected to the output or the output is short-circuited at the end of a length of cable that has sufficient resistance to prevent the current from being large enough to trip the short circuit protection.

Under this condition there is also an excessive current in the half bridge that is sufficient to cause heating and eventual failure but over a longer period of time. The threshold for overload shutdown is approximately 50% above maximum load with a delay of approximately 0.5s. This is based on a current waveform that has a sinusoidal envelope with a high frequency square wave component with 50% duty cycle.

Both shutdown modes have auto reset, which allows the oscillator to start again approximately 1s after shutting down. This is so that if the fault condition is removed the system can start operating normally again without the line voltage having to be switched off and back on again. It also provides a good indication of overload to the end user as all the lamps connected to the system will flash on and off continuously if too many are connected.

The shut down circuit also uses the external CSD capacitor for its timing functions. When the 0.5V threshold is exceeded at CS the CSD is internally disconnected from the voltage compensation circuit and connected to the shutdown circuit. The oscillator operates at minimum frequency when the CSD capacitor is required for shutdown circuit timing. When the 0.5V threshold is exceeded the IR2161 charges CSD rapidly to 4V.

When the shutdown threshold of 0.5V is exceeded the CSD capacitor is charged by current source I_OL and when the threshold of 1.2V is exceeded it is charged by I_SD as well. If 1.2V is exceeded CSD will charge from 4V to 12V in approximately 50 ms. When 0.5V is exceeded but 1.0V is not, CSD charges from 4V to 12V in approximately 0.5s. The timing accounts for the fact that high frequency pulses with approximately 50% duty cycle and a sinusoidal envelope appear at the CS pin. The values of I_SD and I_OL take into account that only at the peak of the mains will the comparator outputs go high and effectively the capacitor will be charged in steps each line half cycle.

If a fault is detected but disappears before CSD reaches 12V then CSD will discharge to 2.5V and then the system will revert to compensation mode without interruption of the output.

Similarly when the system starts up again after a delay the CSD capacitor will be internally switched back to the voltage compensation circuit. If the fault is still present the system will immediately switch CSD back to the shutdown circuit.

The IR2161 can be shut off by applying a voltage above 0.5 VDC to the CS pin. This will cause the system to go directly to fault mode after approximately 1 µS such that it is necessary for VCC to be re-cycled off and on to restart the system.

The IR2161 also includes over-temperature shutdown, which latches the convertor off when the die temperature of the IC exceeds 130-140° C. It is assumed that the die temperature will be approximately 20° C. above the ambient temperature inside the convertor. Depending on layout, heat will be transferred from other devices through the PCB traces into the IC, raising the temperature. This behavior may cause the IC to shut down if high temperatures from the MOSFETs are conducted to the IC.

Calculating RCS

To achieve effective operation in the IR2161 based halogen convertor, the value of the current sense resistor RCS is calculated as follows (see FIG. 8).

Ignoring the output transformer we can assume for this calculation that the load is connected from the half bridge to the midpoint of the two output capacitors and that the voltage at this point will be half the DC bus voltage. The RMS voltage of the DC bus is the same as that of the AC line so we can see that the RMS voltage across the load shown in FIG. 8, will be half the RMS voltage of the line. The load is the maximum rated load of the convertor. The current in Rcs will be half the load current given by:

$$I_{CS(RMS)} = \frac{P_{LOAD}}{V_{AC}}$$

Since the load is resistive the current waveform will have a sinusoidal envelope and so the peak can be easily determined taking into account that the current is has a high frequency component with an approximate 50% duty cycle:

$$I_{CS(PK)} = 2\sqrt{2} \times I_{CS(RMS)}$$

Therefore:

$$V_{CS(PK)} = I_{CS(PK)} \times R_{CS}$$

For correct operation at maximum load the peak voltage should be 0.4V. The calculation can be simplified by combining the formulae, $$R_{CS} = \frac{0.4 \cdot V_{CS}}{2 \cdot \sqrt{2} \cdot P_{LOAD}}$$

Which can be simplified to:

$$R_{CS} = 0.141 \cdot \frac{V_{AC}}{P_{LOAD}}$$

EXAMPLE

For a 100 W convertor working from a 230 VAC supply the current sense resistor would need to be $$\frac{0.141 \times 230}{100} = 0.324 \Omega$$

The nearest preferred value in the E12 range is 0.33 Ohms.

The power dissipation in RCS should also be considered and is given by:

$$P_{CS} = \left(\frac{P_{LOAD}}{V_{AC}}\right)^2 \times R_{CS}$$

In this case:

$$\left(\frac{100}{230}\right)^2 \times 0.33 = 0.062 \text{ W}$$

It is important to bear in mind that the resistor must be rated to handle this current in a high ambient temperature as well as the high currents that occur for a short period under short circuit conditions.

The preferred value of the filter resistor RF is 1K, which will protect the CS input from negative going transients. CF is preferred to be 1 nF so as to filter out switching transients that can impair the operation of the shutdown circuit.

Output Transformer Selection

The size of the core and design of the output transformer are selected bearing in mind the throughput power at maximum load. The core may be a toroid, a pair of E-cores, or any other shape. The turns ratio can be easily determined by the ratio of half the AC line RMS input voltage and the required output, which is usually (but not always) 12V. When the correct number of turns for the primary has been determined, it is simple to calculate the number of secondary turns.

The number of turns required for the primary should be calculated so that at the minimum frequency the transformer will not saturate at the peak voltage, i.e. half the peak DC bus voltage.

It is important to bear in mind that the peak voltage at the DC bus occurs during dimming with a leading edge, triac type, dimmer where the firing angle is at the peak of the line. This is because a transient is produced when the triac is fired and so an additional voltage is added to the DC bus voltage. As a rule the MOSFET breakdown voltage may be used to calculate the primary turns such that the core will not saturate at minimum frequency and maximum temperature. If the core saturates a large current will flow in the half bridge and may trigger the short circuit protection when the convertor is connected via a dimmer.

The transformer selection procedure is as follows:
1. Select the correct core size for the maximum load at 30 kHz. Use the manufacturer's core data to determine the maximum throughput power at this frequency.
2. Calculate the number of turns required at the primary.

$$Np(\min) = \frac{Vpk \cdot Ton(\max)}{2 \cdot B(\max) \cdot Ae}$$

Where Bmax (maximum flux density in Teslas) can be obtained from the core manufacturers data for the Ferrite material operating at a temperature of 100 degrees C. and Ae is the cross sectional area of the magnetic path in mm². Vpk may be considered to be 400V and Ton(max) may be considered to be 18 uS.

3. Calculate the number of turns required at the secondary.

$$Ns = \frac{2 \cdot Np \cdot Vout(\text{rms})}{Vac(\text{rms})}$$

4. Determine the leakage inductance.

This can only be done by measurement. Simply short out the secondary and measure the primary inductance with an LCR bridge. The amount of leakage inductance depends on the physical construction of the transformer, the better the primary and secondary windings are coupled, the lower the leakage inductance will be. However, in this application some leakage inductance is desirable to limit the primary current if the secondary is short circuited. It is also important to consider that a high isolation breakdown voltage (4 kV) is required in this application between the primary and secondary windings, for safety certification of the convertor. This means that winding the primary and secondary close together is not possible and therefore, some leakage inductance will result.

In some designs the output transformer is purposely designed to have a high leakage inductance in order to limit the primary current under short circuit conditions and therefore allow smaller half bridge MOSFETs to be used. In this case the short circuit primary current may be too small to trigger the short circuit protection, the result being that the system will take longer to shut down because only the overload threshold is exceeded at the CS pin. This is unlikely to cause any problems but should be considered.

Preferred is a toroidal output transformer that has the secondary windings spread over as much of the core as possible to minimize the leakage inductance, which is inherently high in such constructions. This allows sufficient current to shut down the convertor rapidly when the output is short circuited.

Ready wound toroidal output transformers are available from Vogt or Kaschke. These have many advantages including high isolation breakdown capability because of the moulded plastic separator between the primary and secondary.

Short Circuit Current

The short circuit current that appears at the primary is dependent on the primary leakage inductance of the output transformer as well as the value of the half bridge capacitors. The half bridge capacitors should be kept as small as possible in order to limit this current. However, they also need to be large enough to be able to handle the ripple current, i.e. half the primary current flowing in each capacitor at the IR2161 oscillator frequency.

Adaptive Dead Time

Because of the fact that the DC bus voltage varies during the mains half cycle the dead time may need to vary in order to achieve soft switching all of the time. The IR2161 has an adaptive dead time system that detects the point at which the voltage at the half bridge slews to 0V (COM) and sets the LO output high at this point. There is an internal sample and hold system that allows the same delay to be used to set HO high after LO has gone low. This reacts on a cycle-by-cycle basis of the oscillator and therefore will adjust the dead time as necessary regardless of external conditions.

The designer does not need to take into account parasitic capacitances in the MOSFETs or leakage inductance in the output transformer and set the dead time accordingly.

The system is designed operate down to dead times of less than 250 nsec which should be low enough to accommodate the output transformer leakage inductance and parasitic MOSFET capacitances of a practical halogen convertor. If the ADT function does not operate, the dead time reverts to a preset fixed value that will, in most cases, prevent serious losses due to hard switching.

In the event of the voltage at the half bridge failing to slew all the way down to COM the adaptive dead time circuit will time out after 1 to 1.5 μsec and switch on the relevant MOSFET thus operating with hard switching. This could happen during the first few cycles after start up. It should never be the case in normal running conditions unless the load is very light or the primary leakage inductance is excessive or an unnecessarily large snubber capacitor is present. This system avoids the need for an external resistor to program the dead time and contributes with the multi functional nature of CSD to the IR2161 being realized with only 8 external pins.

Dimming

Almost any halogen convertor available can be dimmed by an external phase cut dimmer that operates in trailing edge mode. This means that at the beginning of the line voltage half cycle voltage the switch inside the dimmer is closed and mains voltage is supplied to the convertor allowing the convertor to operate normally. At some point during the half cycle the switch inside the dimmer is opened and voltage is no longer applied. The DC bus inside the convertor almost immediately drops to 0V and the output is no longer present. In this way bursts of high frequency output voltage are applied to the lamp. The RMS voltage across the lamp will naturally vary depending on the phase angle at which the dimmer switch switches off. In this way the lamp brightness may easily be varied from zero to maximum output.

Trailing edge dimmers are less common however than leading edge dimmers. This is because they are more expensive to make and need to incorporate a pair of MOSFETs or IGBTs whereas a leading edge dimmer is based around a single triac.

Conversely many halogen convertors are not able to operate with leading edge dimmers because of the fact that they are based around a triac. It is possible however to design a halogen convertor that will work effectively with a triac based dimmer by paying attention to design the input filter components correctly and to ensure that at the firing point of the triac the oscillator will start up rapidly. In the IR2161 based system this is easy to achieve through the addition of RD and CD which conduct a large current to VCC due to the high dv/dt that occurs when the triac fires and the bus voltage rises rapidly from zero to the AC line voltage. If the VCC voltage falls below UVLO- during the time when the triac in the dimmer is off, the soft start will not be initiated, because the soft start circuit is not reset until VCC drops approximately 2V below UVLO-. This takes some time as the VCC capacitor discharges very slowly during UVLO micro-power operation. The intermediate period is referred to as Standby mode.

During dimming the voltage compensation circuit will cause a frequency shift upward at angles above 90° because the peak voltage at CS will be reduced, however this will not have a noticeable effect on the light output.

The problem associated with operation of halogen convertors with triac dimmers is that after a triac has been fired it will conduct until the current falls below its holding current. If the load is purely resistive (as in a filament lamp directly connected to the dimmer) this will naturally happen at the end of the line voltage half cycle as the current has to fall to zero. In a halogen convertor a capacitor and inductor are placed at the AC input to comply with regulations regarding EM conducted emissions. This means that when the line voltage falls to zero there could still be some current flowing that is enough to keep the triac switched on and so the next cycle will follow through and not be phase cut as required. This can happen intermittently resulting in flickering of the lamps. The way to avoid the problem is to ensure that the product has the smallest possible filter capacitor CF and to state a minimum load for the convertor. This would be typically one third of the maximum load to avoid problems of this kind.

EMC Issues

An EMC filter consisting of a capacitor CLF and inductor LF is included. The capacitor value may not be increased beyond a certain point to improve filtering as this causes problems when dimming with triac type phase cut dimmers, i.e. that the phase shift introduced can prevent the triac current dropping below its holding current at the end of the line voltage half cycle and so the dimmer no longer functions. In order to prevent this, the proportion of resistive load presented to the dimmer output must be sufficient for the capacitance. A good rule of thumb to apply is that no more than 1 nF of capacitance should be used per Watt of the maximum power rating of the convertor, e.g. for a 100 W convertor, use a 100 nF capacitor. This should allow dimming to work even at reduced loads without any difficulties.

The filter inductor value should be increased to reduce the conducted emmissions below the limits of the applicable EMC standard. The inductor should have a powdered Iron core rather than Ferrite as this can handle a much larger current before saturating.

Layout Issues

It is very important when laying out the PCB for the IR2161 to consider the following points:
1. CVCC2 should be as close to the IC as possible.
2. CSD should be as close to the IC as possible.
3. C1 and C2 should be placed close to the MOSFETs Q1 and Q2 and close to RCS and the output transformer primary, so that the primary high frequency current path may be as short as possible.
4. CF should be placed close to the IC so that one side can be very close to the current sense (CS) pin and the other side as close to the IC COM pin as possible.
5. The traces leading from the transformer secondary to the output need to carry a large current and so should be made as large as possible.
6. Large creepage and clearance distances must be left between the primary and secondary side of the transformer to accommodate the 4 kV isolation breakdown requirement.
7. Sufficient space must be left between traces connected to the low side and the high side outputs of the IC. Also any traces carrying high voltage from the AC line or the DC bus must have sufficient spacing from low voltage traces to prevent the possibility of arcing.

For additional description of the IR2161 Control IC, reference may be made to Ser. No. 10/443,525 as mentioned above.

SUMMARY OF THE INVENTION

The present invention provides additional functionality to the IR2161 Control IC described above.

Other features and advantages of the present invention will become apparent from the following description of embodiments of the invention which refers to the accompanying drawings.

BRIEF DESCRIPTION OF THE DRAWING(S)

DETAILED DESCRIPTION OF EMBODIMENTS OF THE INVENTION

Figure 1:
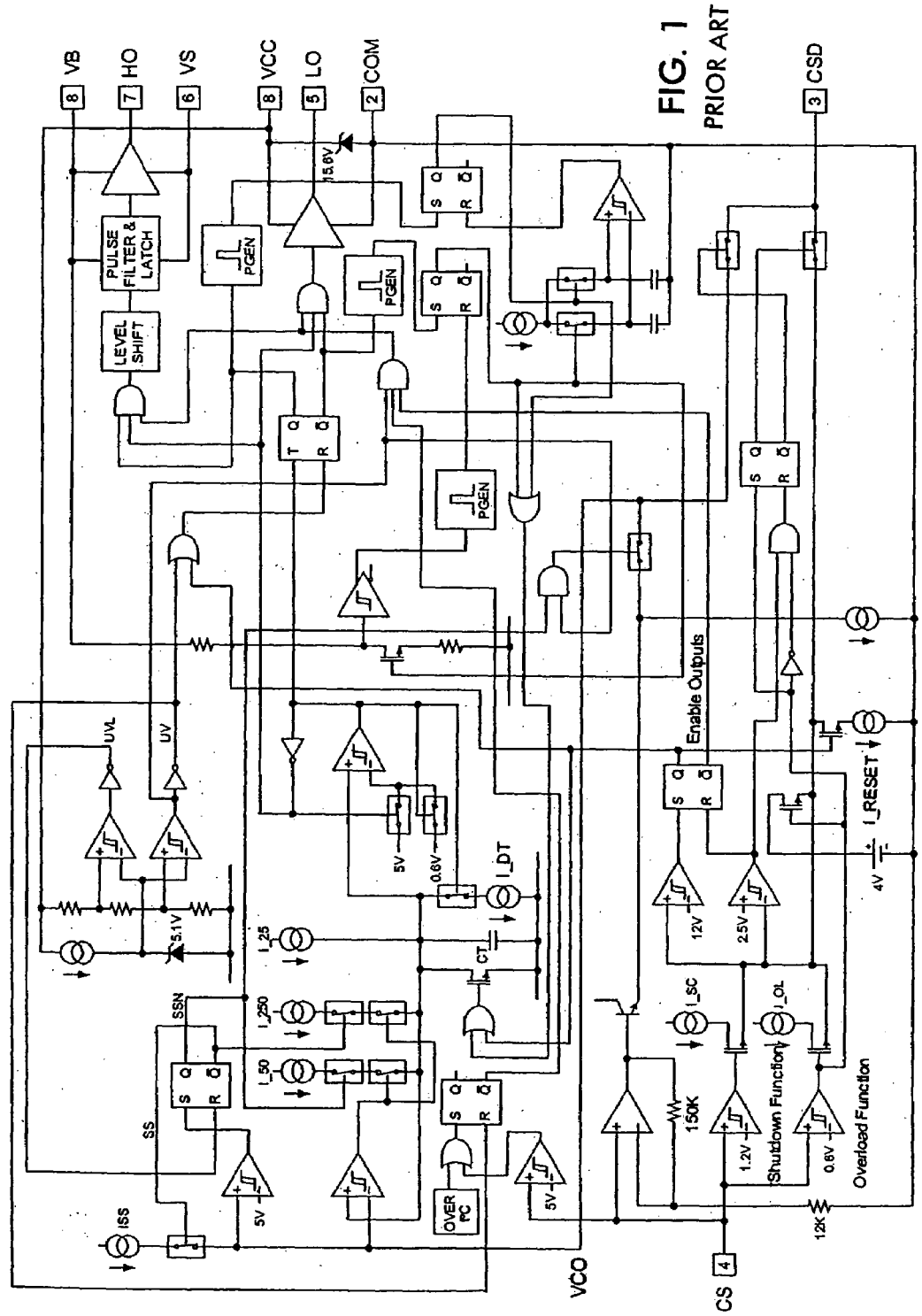
FIG. 1 is a block diagram and FIG. 2 is an application schematic diagram of the IR2161 halogen driver IC.
Figure 2:
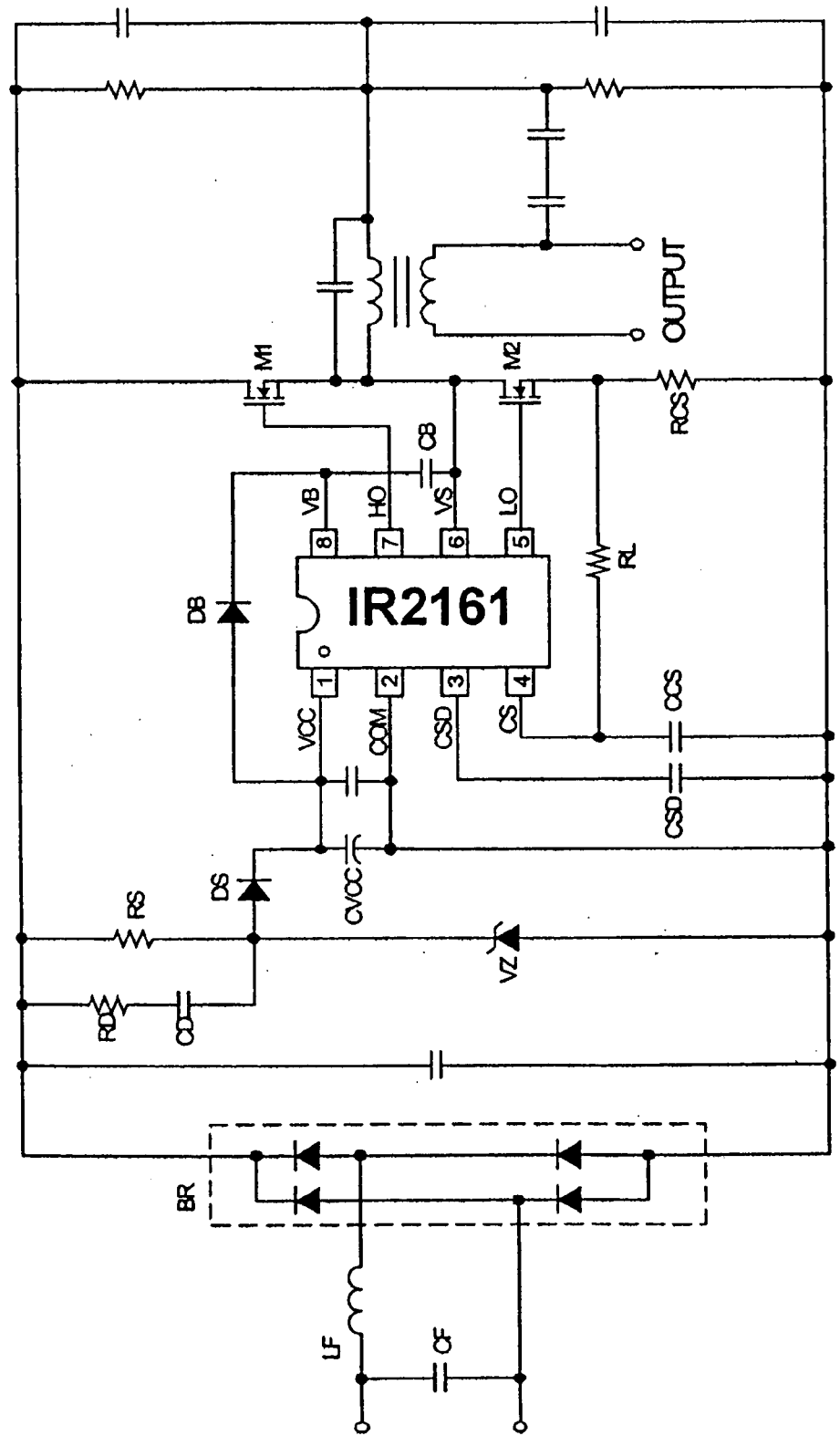
Figure 3:
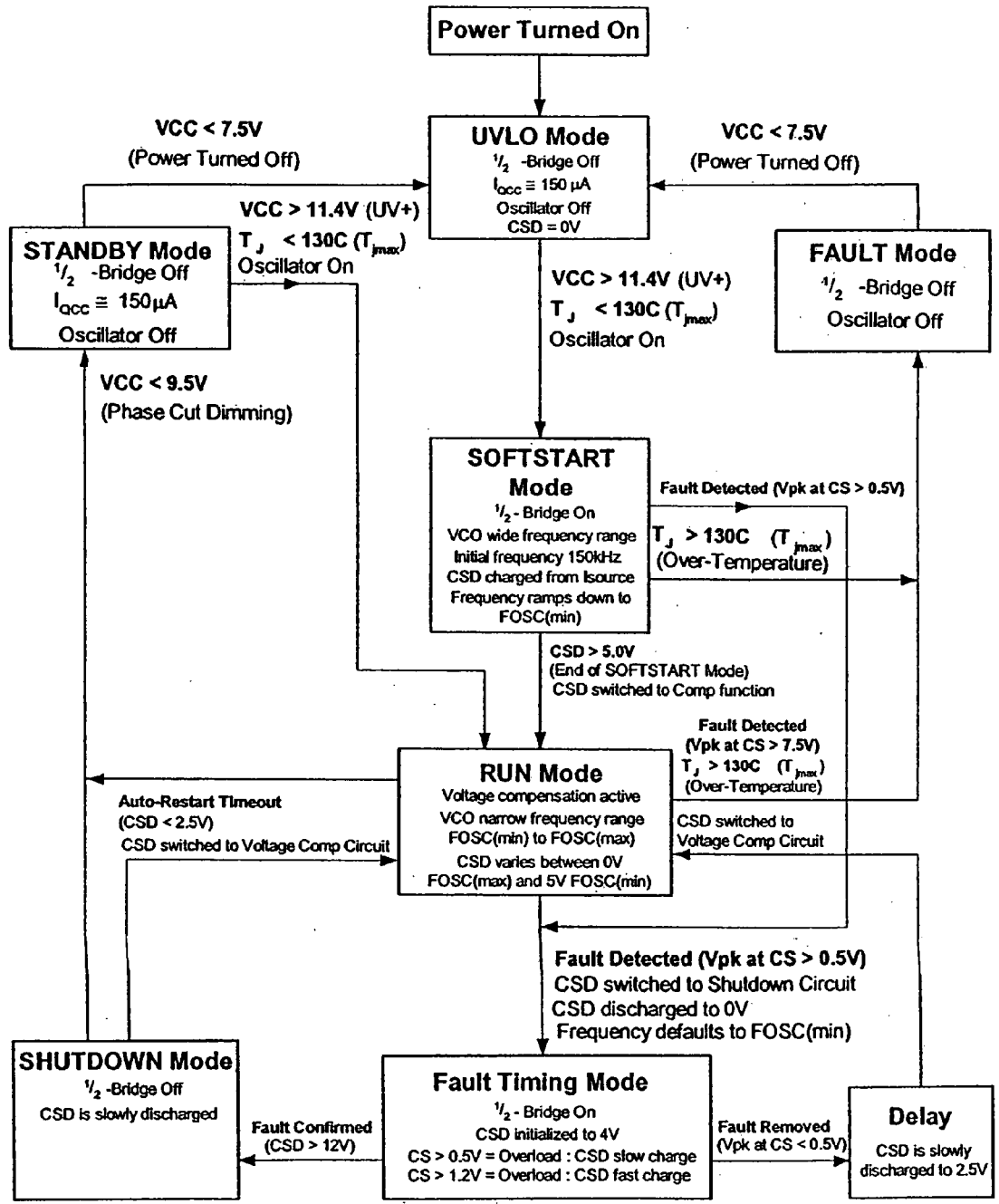
FIG. 3 is a state diagram drawing operating modes in the IR2161.
Figure 4:
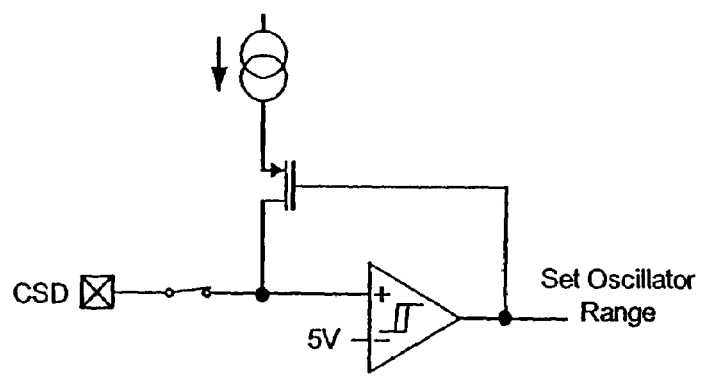
FIG. 4 shows a soft start circuit.
Figure 6A:
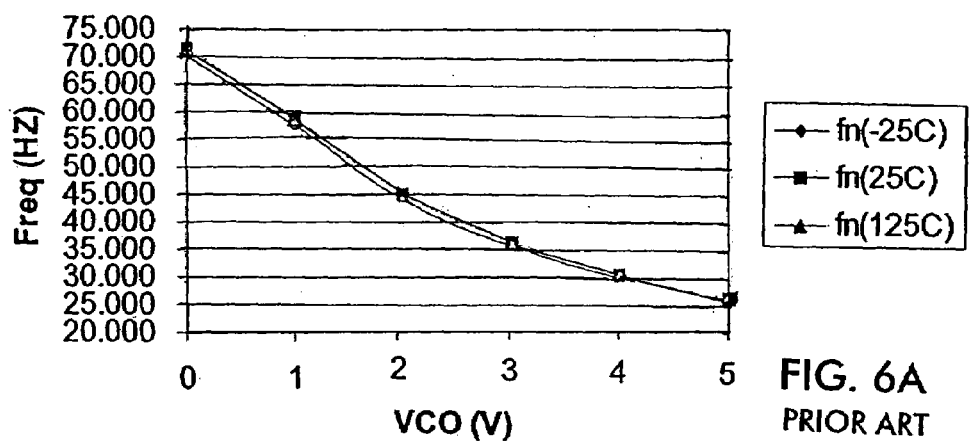
FIGS. 6A and 6B are graphs showing VCO frequency ranges as a function of temperature in running mode and soft start mode, respectively.
Figure 6B:
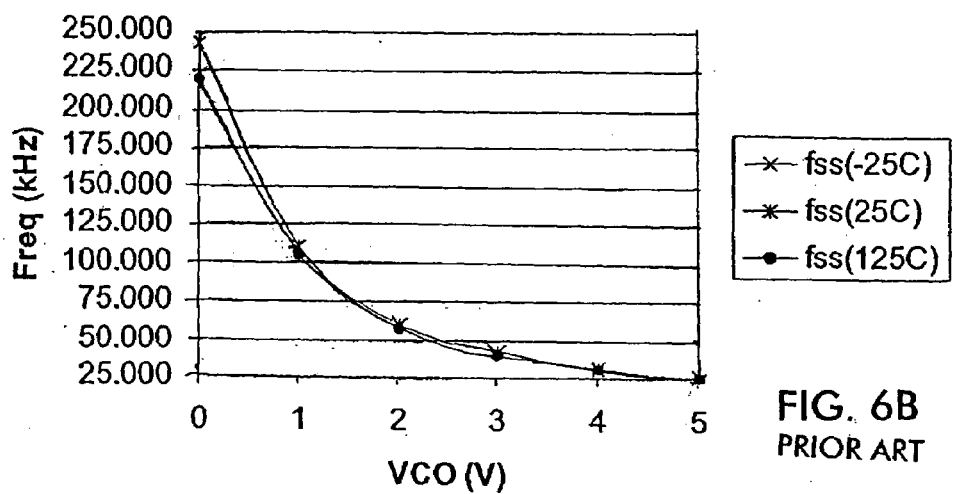
Figure 5:
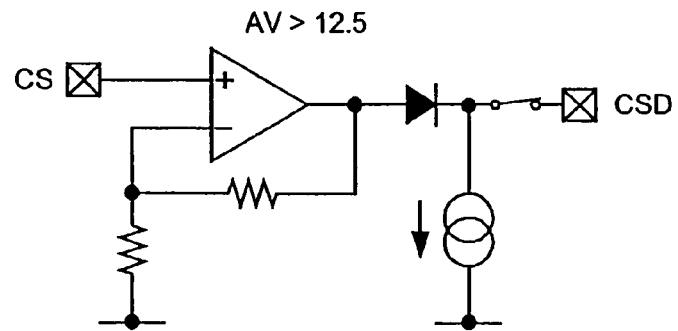
FIG. 5 shows a circuit for discharging an external capacitor.
Figure 7:
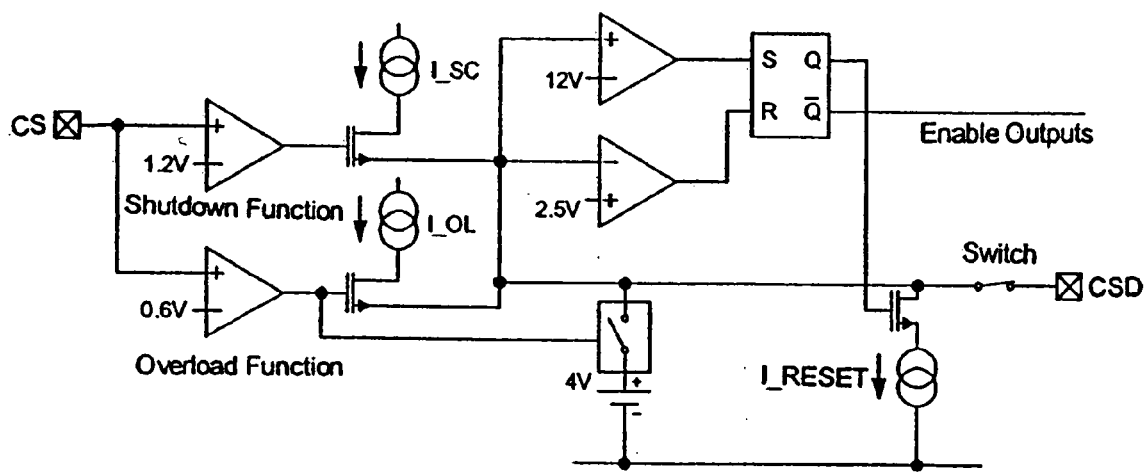
FIG. 7 shows a dual-mode auto-resetting shutdown circuit.
Figure 8:
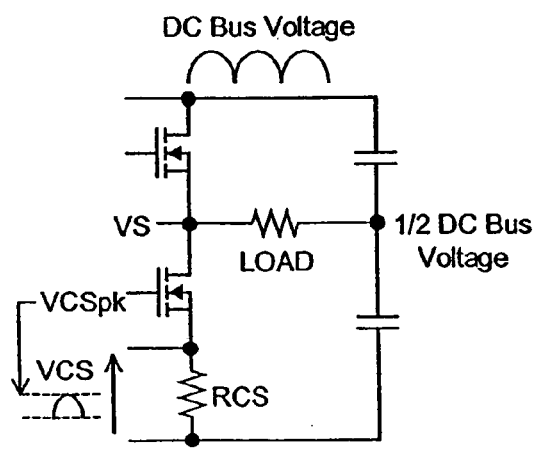
FIG. 8 shows a circuit including a current sense resistor.
Figure 9:
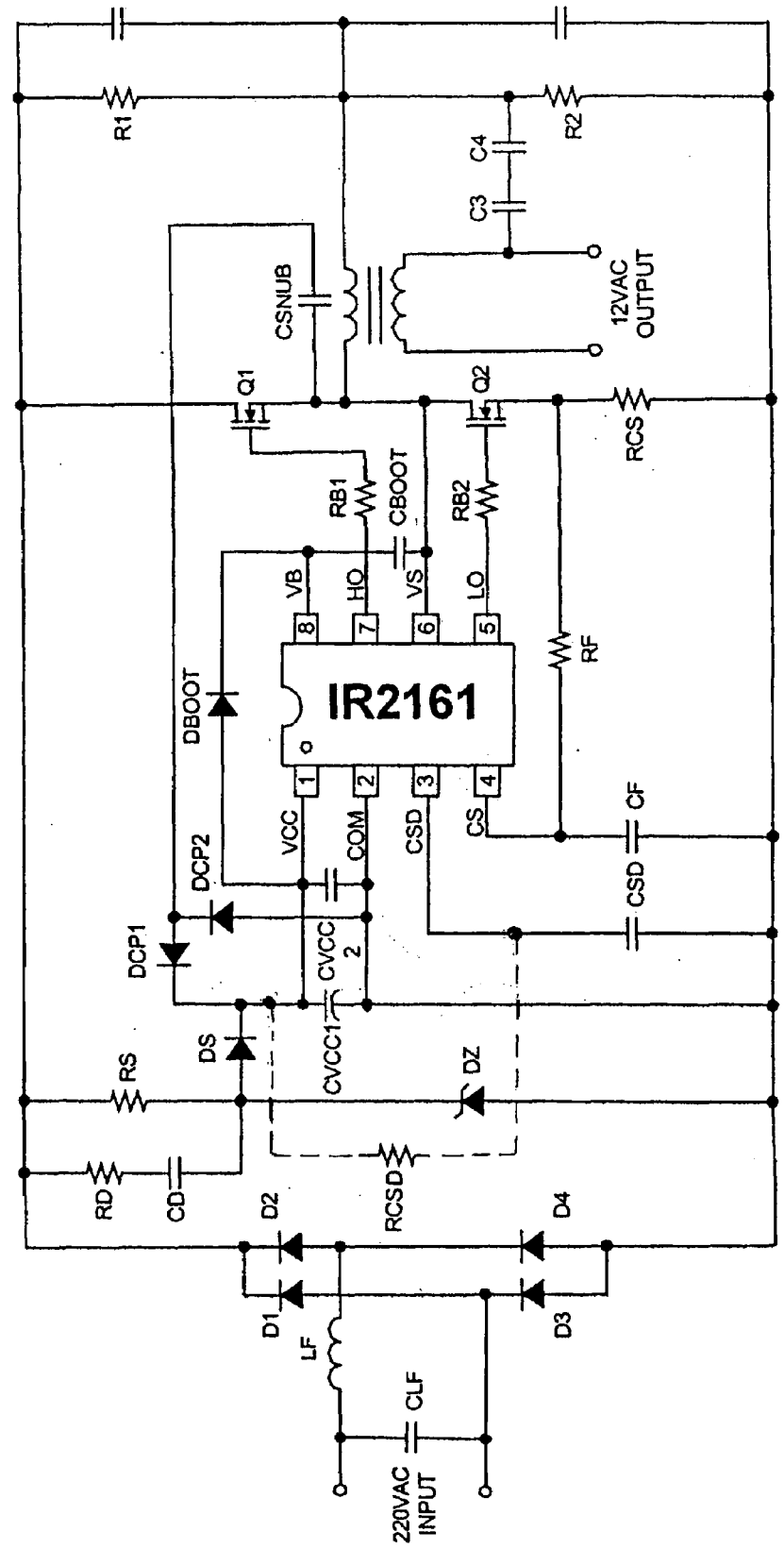
FIG. 9 is a schematic diagram of a first embodiment of the invention.

FIG. 9 shows a modification of the circuit shown in FIG. 2. Gate drive resistors RB1 and RB2 are provided between the HO and LO outputs and the respective MOSFETS Q1 and Q2.

Also seen is a charge pump consisting of CSNUB connected to two diodes, DCP1 and DCP2, which feeds current back from the half bridge (VS) to VCC and sustains the supply to the IC after it has been initially started. This arrangement avoids the necessity for RS to supply all the current to VCC, which would require RS to dissipate around 2 W in a 220 VAC supplied system. This would be undesirable as 2 W power dissipated as heat within the convertor adds significantly to the temperature rise. When selecting the value of RS, there is a tradeoff between power dissipation and the ability of the convertor to start up when connected to a dimmer that is set to a very low level. When a dimmer is set close to minimum and the supply to the convertor is switched on, only a small voltage will appear on the DC bus, so RS must be small enough for this to provide sufficient starting current for VCC. However, the smaller the value of RS is, the more power it will dissipate. It should be noted that the above considerations are important in a 220 VAC system, but in a 120 VAC system a charge pump would not be necessary and RS could supply VCC without dissipating significant power. Other considerations such as the high primary current become more problematic in a 120 VAC system.

In this design, the slew rate can easily be increased, if necessary, by increasing the value of the snubber capacitor. This, however, could result in the failure of the VS voltage to slew completely at reduced loads and so CSNUB should be kept as low as possible, but high enough to maintain the supply for the charge pump to VCC. Some of the supply current may also be provided through RD and CD allowing the charge pump to provide only part of it, and hence allowing the value of CSNUB to be as low as 220 pF.

The optional resistor RCSD shown in dashed lines in FIG. 9 will be discussed below.

Open Circuit Protection

Figure 10:
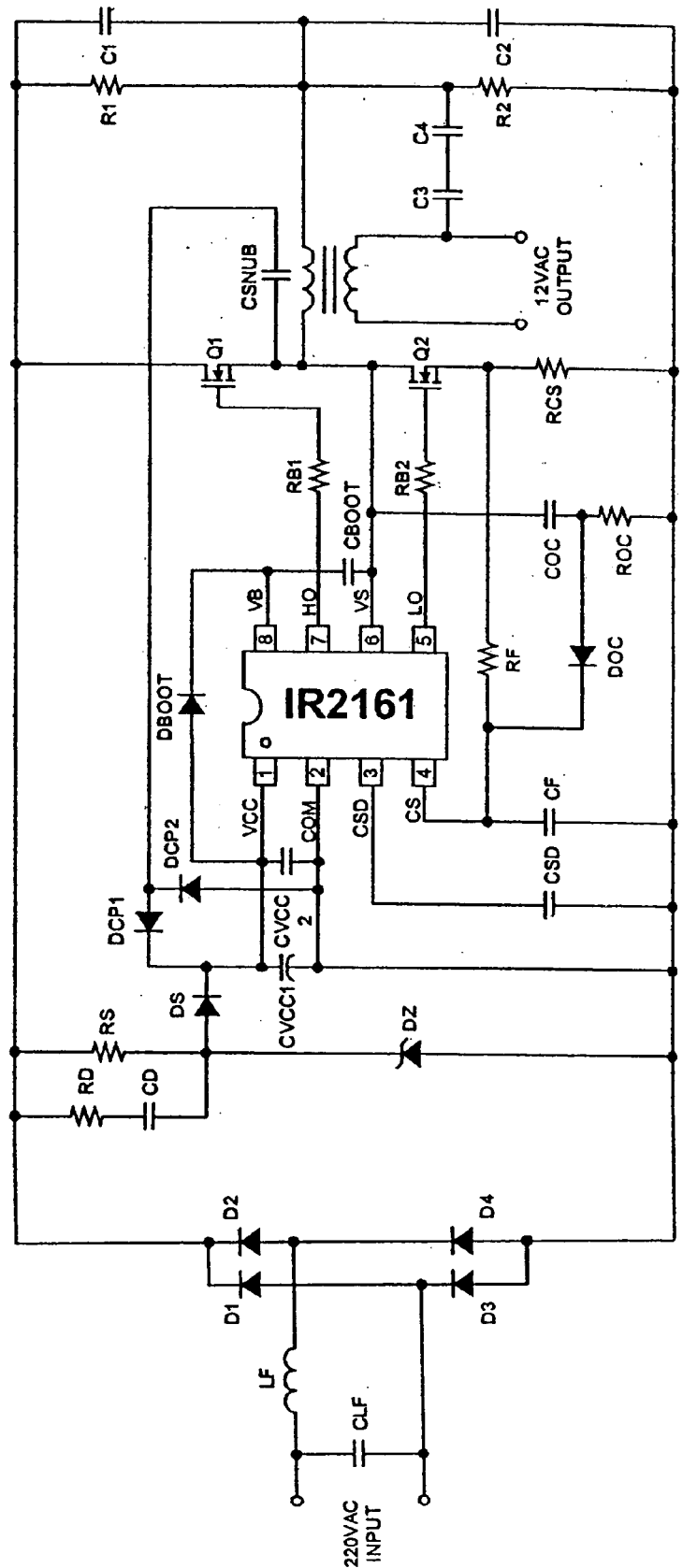
FIG. 10 is a schematic diagram of a second embodiment of the invention.

In some designs it has been found that the MOSFETs overheat under a continuous open circuit condition. This depends largely on the size of the MOSFETs and the value of the snubber capacitor CSNUB. In the design of FIG. 10 the value of CSNUB may be kept very small in order to allow the adaptive dead-time circuit to function over as wide a range of loads as possible. In this case it is helpful to augment the VCC supply current by the current from RD and CD to be sufficient to operate the IR2161 and surrounding circuitry.

It is also known that when the load is reduced below a certain level, the adaptive dead-time function within the IR2161 is no longer able to operate due to the fact that the VS voltage no longer slews all the way down to COM but instead starts to ring out into an oscillation. In this case the dead time becomes a fixed default value of approximately 1.2 μsec. When there is no load, hard switching of the MOSFETs may result because commutation is impossible under this condition. Consequently high dV/dT occurs at VS causing large transient currents to flow through CSNUB and the parasitic capacitances in the MOSFETs. Therefore in a higher power design where the MOSFETs need to have a larger die size to support the current, the parasitic capacitances are higher and the value of CSNUB also needs to be higher in order to provide the greater supply current needed at VCC to provide the necessary gate drive. In this situation the transient currents in the MOSFETs under an open circuit condition cause serious overheating and eventual damage. A method has therefore been devised that allows the open circuit condition to trigger the short circuit protection feature of the IC and cause it to go into the 50 ms on and 1s off auto restarting mode, therefore preventing the MOSFETs from overheating.

The capacitor COC can be a small value, e.g. 100 pF to minimize the additional snubbing capacitance added and ROC can be in the order of ohms, e.g. 10 ohms to develop a voltage peak sufficiently high to conduct through the diode DOC, which can be a 1N4148. The transient voltages will charge CF above the short circuit threshold under conditions of total hard switching and cause the IR2161 to shut down as if a short circuit had occurred. The values of COC and ROC are selected so that under normal operating conditions the voltage developed at the anode of DOC due to the dV/dT at VS when soft switching is occurring is not sufficient to trigger the short circuit protection.

Short Circuit Protection

It has been found that if the basic halogen circuit of FIG. 2 is subjected to a continuous short circuit, the MOSFETs Q1 and Q2 will gradually heat up under normal self-resetting operation. The MOSFETs can eventually reach a very high temperature and fail. This effect is compunded by the fact that as MOSFETs increase in temperature, the RDS(on) value also increases, which results in additional losses and even more heating. In some designs, where there are no heat sinks on the MOSFETs, this can be a problem.

The gate drive resistors RB1 and RB2 in FIG. 9 are effective to prevent high dv/dt from occurring that can cause the HO output to miss pulses under short circuit condition. If this situation arises the shut down circuit will fail to operate correctly within the IR2161. The choice of gate drive resistors depends on the MOSFETs used. In some cases 33 ohms has been found to be more reliable than 22 ohms. The tradeoff is that the MOSFETs will run slightly hotter, the larger the gate drive resistors. Effective gate drive resistor values can be determined by tests with the system driving a short circuit load for several minutes to determine that the MOSFET temperature remains within acceptable limits and operation remains stable.

Thermal Shutdown

One simple method of avoiding the MOSFETs reaching excessive temperature during a prolonged short circuit condition is to make use of the thermal shutdown feature of the IR2161. If the MOSFETs reach a sufficiently high temperature, some of the heat is conducted through the copper traces of the PCB to the die of the IC itself. If the die becomes sufficiently hot, the thermal shutdown will operate and the IC will shut down before the MOSFETs are damaged. This shutdown is latching until the line voltage is re-cycled.

This method relies heavily on there being very good thermal conduction between the IC and the power MOSFETs. In order to optimize this, the copper trace from the VS pin to the two MOSFETs can be made short and provided with as much copper area as possible.

The effectiveness of this method depends very much on the type of MOSFETs used and the layout of the PCB. It may also be useful for the MOSFETs to have heatsinks.

Extending the Resetting Time

Referring again to FIG. 9, the reset time of the shutdown circuit is greatly extended by adding a resistor RCSD of high ohmic value between the CSD pin of the IR2161 and VCC. This effectively prolongs the time taken for the CSD capacitor to discharge from 12V to 2.5V during the resetting phase of the shutdown sequence. It has negligible effect on the time that the IC takes to shut down under short circuit but increases the re-start time from 2 sec to several seconds more. A 22 Meg resistor will extend the reset time without preventing the IC from resetting altogether.

Thus, the heating of the power MOSFETs under a continuous short circuit condition is reduced by allowing the devices more time to cool between the periods when the system is operating and delivering a high current. In this way it is possible to greatly slow down the heating of the devices under this condition.

Latched Shutdown

In designs where the power switches are small and not able to survive a continuous short circuit condition the solution is to make the shutdown latching so that the supply voltage must be switched off and then back on again in order for the system to begin operating again.

The IR2161 has a latching shutdown feature that can be triggered by applying a voltage above 9V to the CS pin for more than 1 μS. This threshold is too high to allow the latching shutdown function of the IR2161 to be used from the current sense pin voltage or the voltage developed across ROC in the circuit of FIG. 10. The intention for this function was that it should be activated by external circuitry in specialized applications where a higher fault voltage is available.

Consequently an additional circuit has been devised (see FIG. 11) that uses a small SCR (SCR1) connected from VCC to COM that can be configured to shut down in the event of a short circuit. Delay is added via R9 and C5 to ensure that the system will never shut down due to the inrush current at switch-on that occurs if the lamps are cold. This latched shutdown method is described in detail in the following section describing the self dimming circuit.

Self Dimming

In some applications it is necessary for an electronic transformer to be dimmable from a built in potentiometer. This is simple to implement in a traditional bipolar self-oscillating circuit but not quite so simple with the IR2161.

Figure 11:
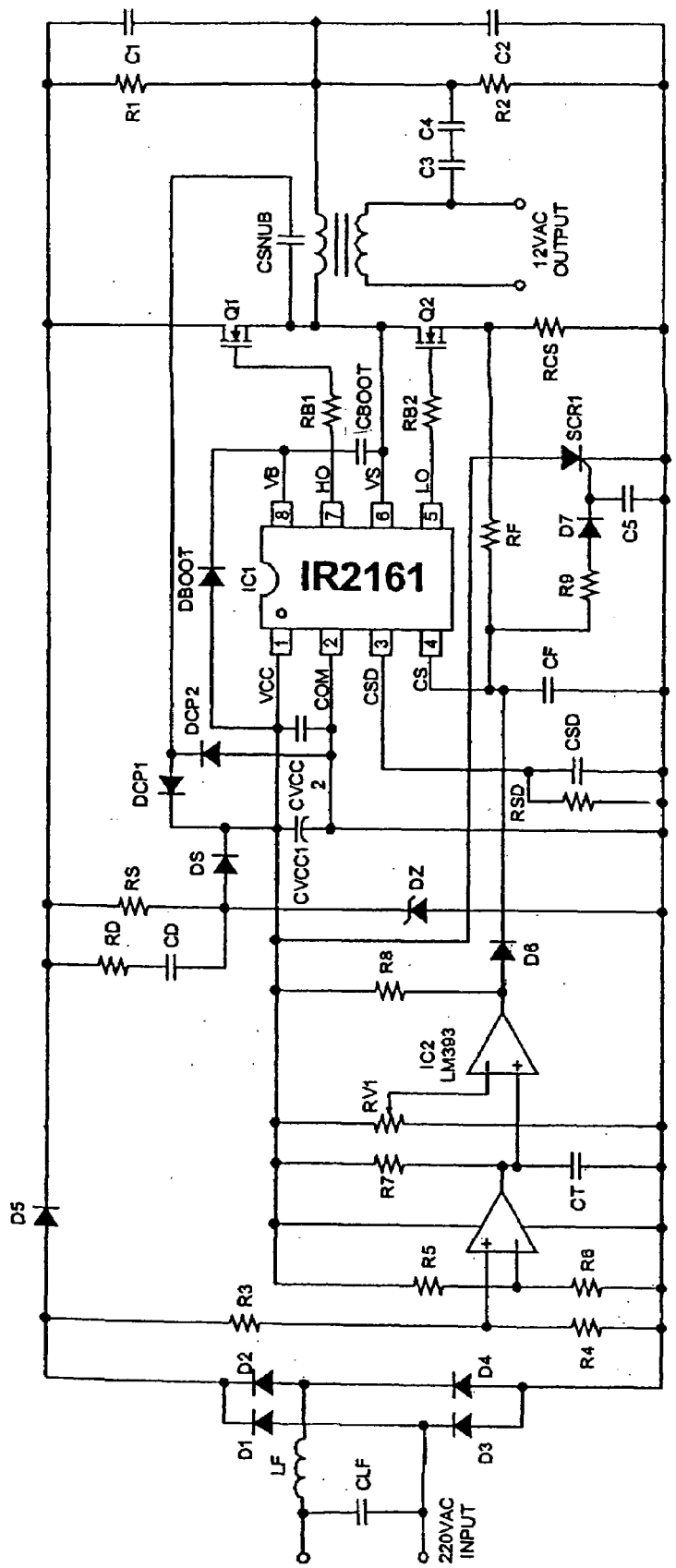
FIG. 11 is a schematic diagram of a third embodiment of the invention, including a self-dimming feature.
Figure 12:
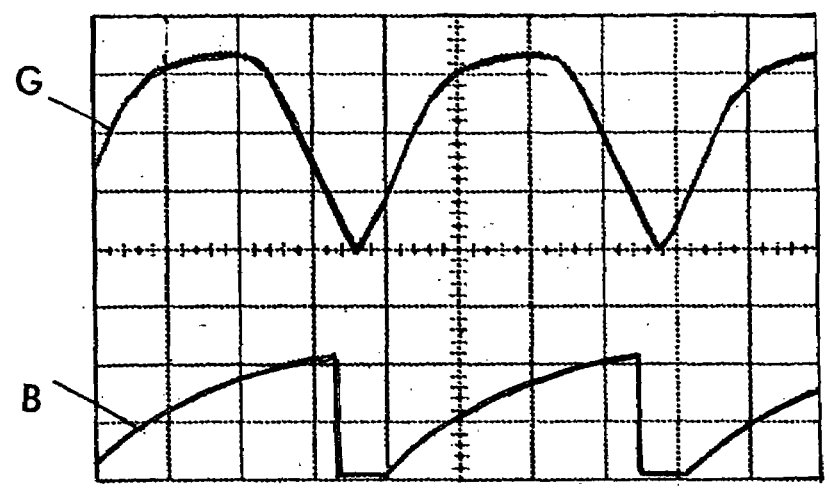
FIGS. 12 and 13 show signals in the control circuit of FIG. 11.
Figure 13:
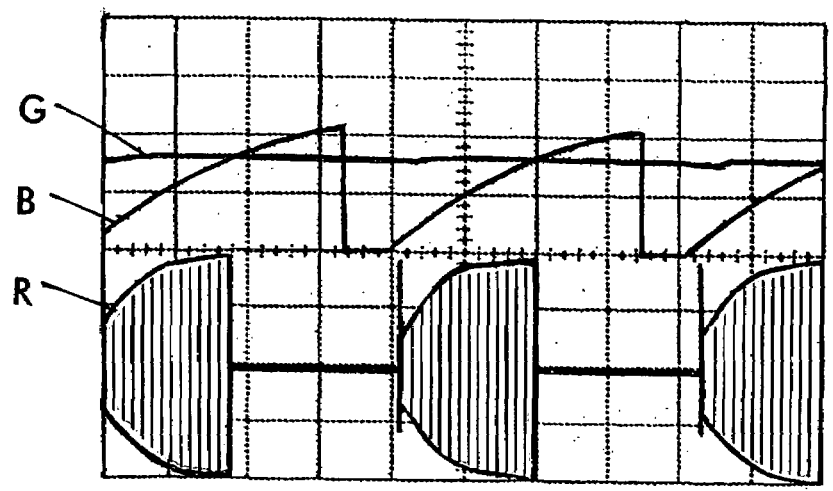

The circuit shown in FIG. 11 has however been found to be very effective. It is able to provide flicker free dimming from 100% to zero output. A low cost dual comparator IC (IC2) has been added, which has open collector or drain outputs. The additional circuitry can be supplied from VCC without drawing excessive current, although the value of RS may need to be reduced to around 56K (a lower value may be necessary) to supply the extra current needed. A ramp waveform (see B in FIGS. 12-13), which is synchronized to the line voltage half-cycle shown at G in FIG. 12, is generated at CT. This signal is fed into the positive input to the second comparator IC2, where the negative input is a DC control voltage derived from the potentiometer RV1 (G in FIG. 13), producing a line locked rectangular waveform at the output, with a variable duty cycle. When this output is high, the CS pin is pulled above the short circuit threshold through D6, causing the IR2161 to shut down. In order for this circuit to operate, the shut down delay must be greatly reduced and so CSD has to be reduced for example to 1 nF. A parallel resistor RSD of 1 Meg is also added to provide a quick discharge for CSD when the voltage from D6 drops again. R8 is low enough in value for a sufficiently high voltage to appear at CS when the comparator output is high, considering that RF effectively provides a 1K pull down to COM. R8 should not be any lower than is necessary to provide about 1.5V at CS when the comparator output is high, to minimize the current drawn from VCC.

This dimming function works very well but also may prevent the short circuit protection from operating. To overcome this shortcoming, an external short circuit protection circuit has been added. In the event of a short circuit, SCR1 will fire and pull VCC down below the UVLO-threshold, shutting down the IR2161. The current from RS will maintain the holding current of SCR1 so that the AC supply will have to be switched off and then switched back on again in order for the circuit to operate again.

In the example shown here trailing edge dimming has been implemented (see R in FIG. 13) as this produces fewer harmonics on the ac line current waveform and requires less filtering. It is possible to provide leading edge dimming using the same circuit by reversing the inputs to the second comparator IC2.

Implementation of DALI with the IR2161

DALI (Digitally Addressable Lighting Interface) is a method of dimming through a serial digital bus DALI BUS and can be implemented into the system using an extension of the circuit concepts described in the above section Self Dimming. See FIG. 14. The section of circuitry containing the dual comparators is now no longer necessary and may be replaced with a microcontroller IC2. A wide choice of microcontrollers are available, many of which contain very useful additional hardware such as comparators, which could be used to realize for example the shutdown circuitry in the microcontroller instead of with an extra circuit as shown in FIG. 11. One IO port from the microcontroller will be fed through a diode D6 into the CS pin of the IR2161 to enable and disable the IR2161. The value of CSD will be for example 1 nF and RSD will be for example 1 Meg. The resistors R3 and R4 dividing down from the DC bus at the cathodes of D1, D2 and D6 of FIG. 11 may be used to provide line voltage cycle zero crossing detection. It would be advisable to clamp the signal with a 5.6V zener diode (not shown) to prevent possible excess voltage from being applied to the microcontroller IO input.

Also, a 5V supply is derived from VCC for the microcontroller. This could probably be implemented with a simple resistor and zener diode arrangement. It is important that the microcontroller is powered at all times even when the system is switched off, although in this state it can be in a low power sleep mode. If necessary an auxiliary winding can be added to the output transformer to provide additional VCC supply current when the system is running and when this is used (see FIG. 14) the charge pump is no longer necessary.

With regard to programming the microcontroller, a very similar code to that used in International Rectifier's reference design DALI ballast IRPLDIM2, available from International Rectifier, could be used. One important change to be made would be that the PWM output that controls the dimming level would need to be synchronized to the line frequency and used to drive the IR2161 CS pin directly providing phase cut dimming. This allows flicker free dimming to be obtained.

Figure 14:
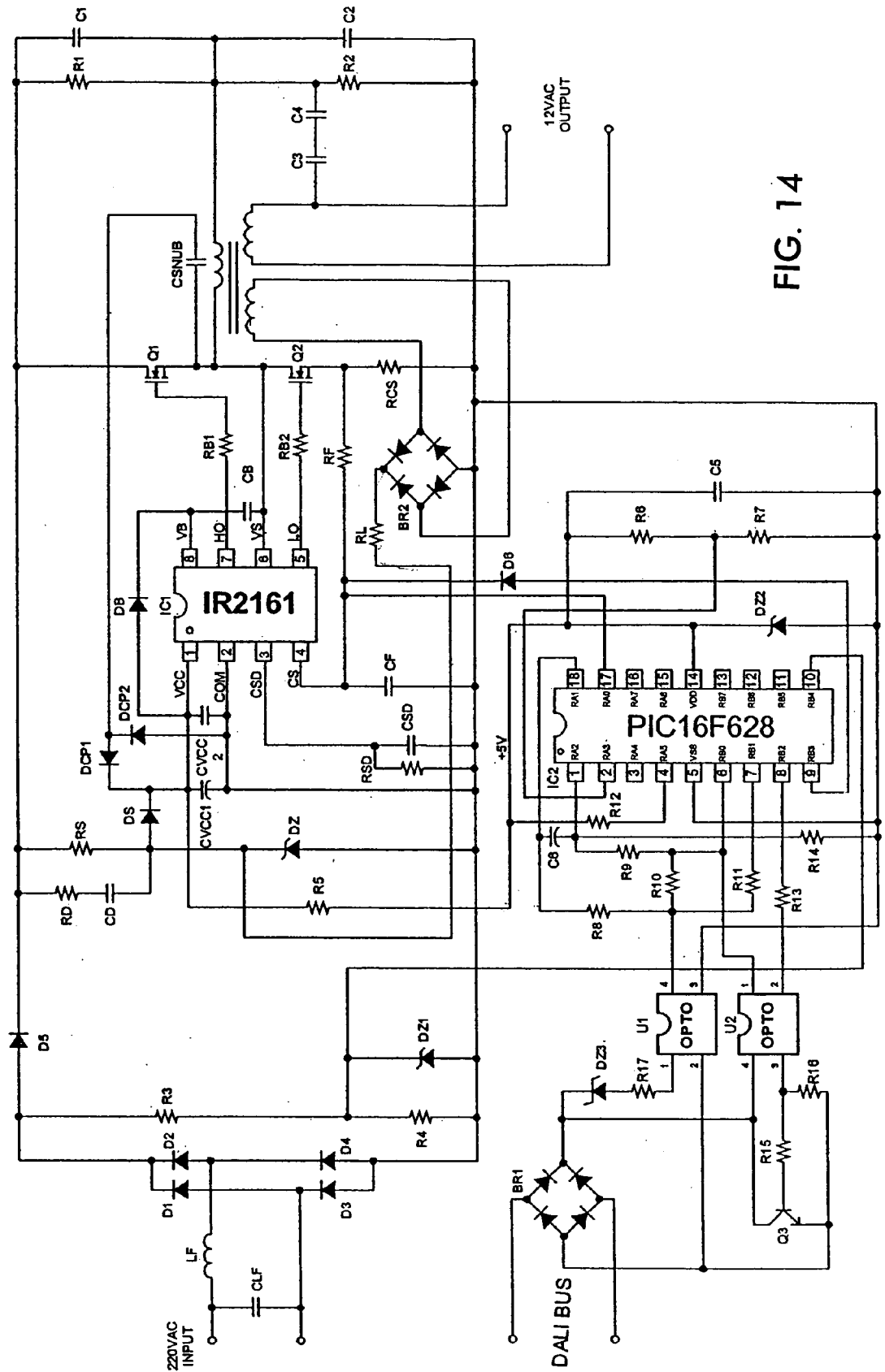
FIG. 14 is a schematic diagram of a fourth embodiment of the invention, including an arrangement for controlling the control circuit with the DALI BUS system.

The schematic shown in FIG. 14 illustrates how the DALI section of circuitry from reference design kit IRPLDIM2 could be inserted into an electronic transformer based around the IR2161. The software that operates the IRPLDIM2 reference design can be readily adapted to operate in this case. The circuit shown in FIG. 14 is only an example of how DALI could be implemented and other effective implementations may be developed by those skilled in the art.

In addition, this implementation utilizes the microcontroller for the shutdown function. The signal at the current sense CS is fed into one of the IO ports of the PIC16F628. This microcontroller can be configured so that inputs RA0 and RA3 form the inputs of a comparator and therefore the voltage set by the R6/R7 divider sets the threshold for the current sense. It is also advisable to increase the value of CF to remove the high frequency component of the signal, so the microcontroller will monitor the peak current more easily. The software can be programmed with a delayed shutdown and auto restart operation if required, instead of simply to shut down completely.

Line Voltage Compensation

Line voltage compensation has not generally been provided in electronic transformers. For optimum performance the lamps should be driven at their correct power rating, which means that the RMS output voltage of the transformer needs to be within reasonable limits. Since there is some degree of load regulation in any electronic transformer, the reality is that most designs can provide the correct output voltage over a range of loads from 20% to maximum, but only provided the AC input voltage is fixed. Therefore a transformer rated for 230 VAC will provide a low light output if used with a 220 VAC supply and overdrive the lamps, shortening the lamp life, if used from a 240 VAC supply.

In certain high end applications it may be desirable to introduce some additional regulation that allows the transformer to operate over a range of input voltage as well as load. The most effective way of doing this is by adding a regulated power factor correcting boost converter at the front end that would produce a smooth and regulated DC bus. Such front end pre-regulators are commonly used in electronic ballasts for fluorescent and HID applications and are based on industry standard low cost power factor control ICs. The drawback is that an additional inductor is required.

This approach would allow a simple electronic transformer circuit as shown in FIG. 9 or FIG. 10 to be added to the back end where the only changes required would be to the output transformer turns ratio and possibly the value of RCS.

Regulation by Frequency

Figure 15:
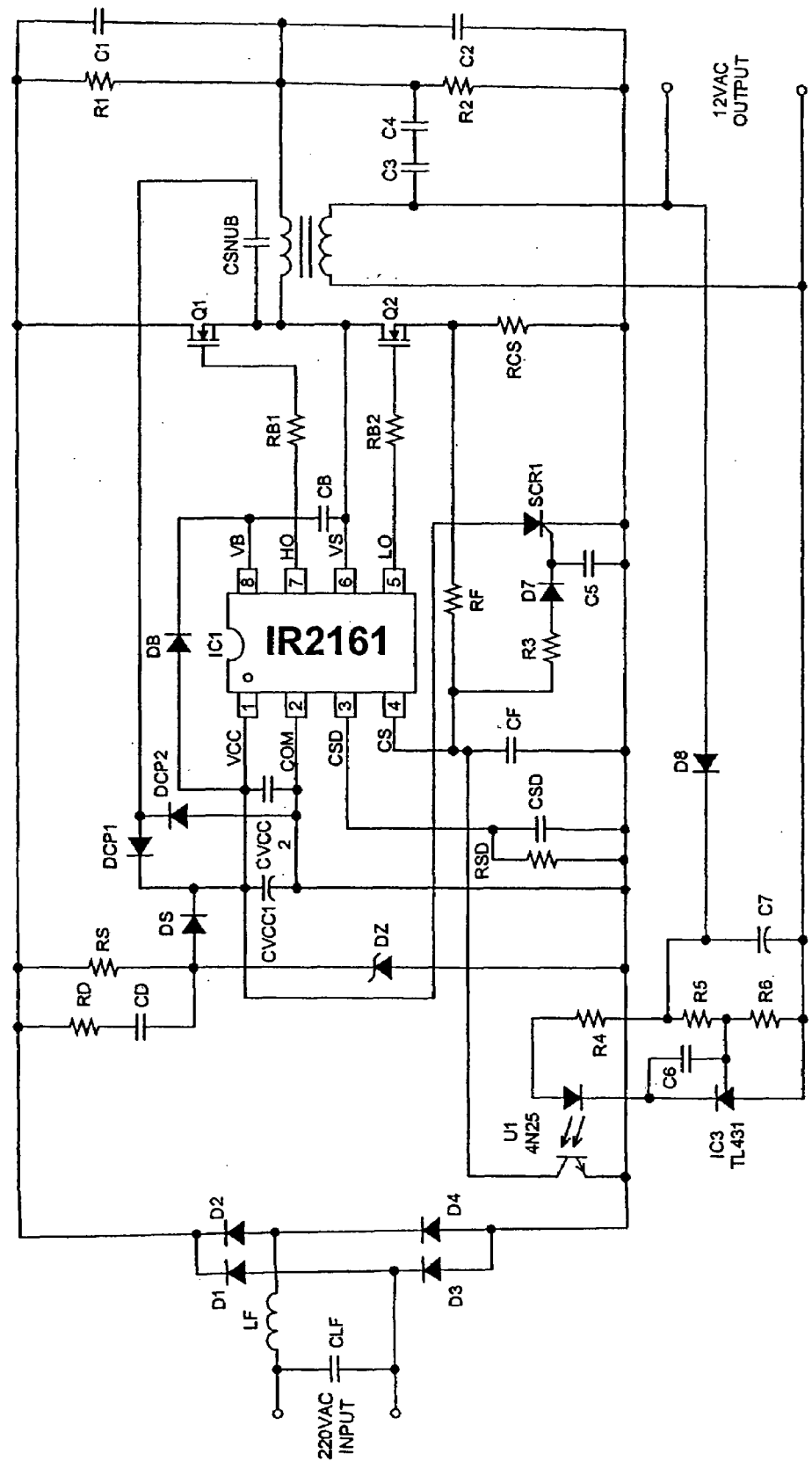
FIG. 15 is a schematic diagram of a fifth embodiment of the invention, which regulates voltage as a function of frequency.

The circuit shown in FIG. 15 shows a method of adjusting the output voltage by pulling down on the CS pin when the voltage increases to a certain point. This will cause the frequency to increase and as a result the output voltage will drop again due to the primary leakage inductance of the output transformer.

The method used to sense the output voltage relies on peak detection and is sufficiently accurate for the application. A DC voltage is produced at C7, which is roughly proportional to the RMS output of the transformer. This voltage is divided down (R4, R5, R6) and fed into IC3, a low cost industry standard programmable zener diode with 1% tolerance. The reference voltage is 2.5V, which when exceeded causes the device to conduct from cathode to anode like a regular zener diode. When IC3 conducts there is current in the diode of the optoisolator UI thus causing the optotransistor to switch on and pull down on the CS pin of the IR2161.

This circuit also prevents the shutdown circuit of the IR2161 from operating in the normal way, making it desirable to add the external SCR based protection circuit of FIG. 11.

The performance results obtained from this circuit depend greatly on the amount of leakage inductance of the output transformer, because the more leakage inductance there is, the more voltage shift will be obtained by adjusting the frequency. The accuracy of the sensing method of the output voltage is also a major contributing factor in the performance of this circuit.

Regulation by Phase Cutting

Figure 16:
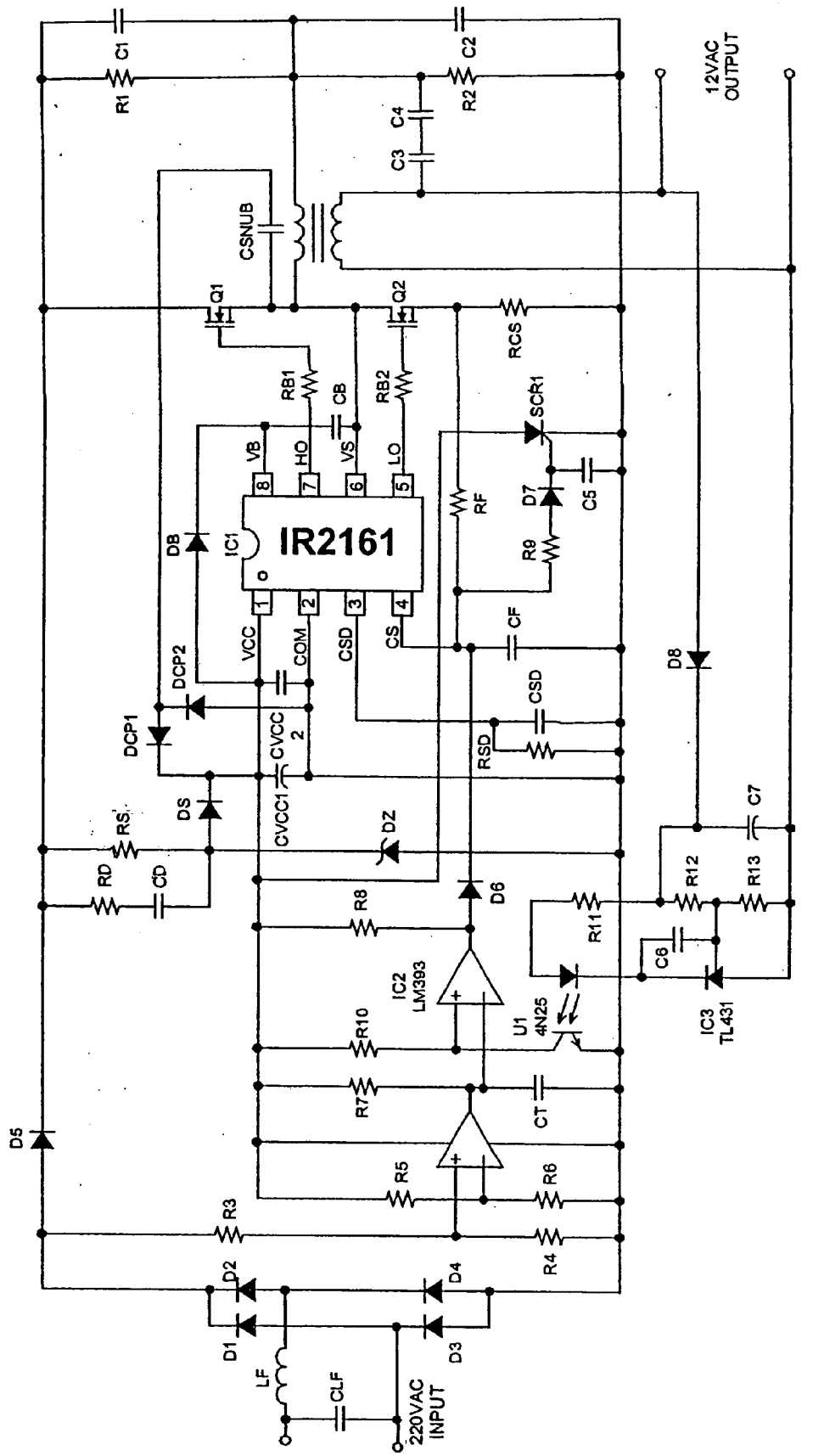
FIG. 16 is a schematic diagram of the sixth embodiment of the invention with regulation of output voltage by phase cutting.

Another approach is shown in FIG. 16 in which the adjustment range of the output can be whatever is required because the output is phase-cut as in the self-dimming circuit of FIG. 11. The method of FIG. 11 can give better performance than the frequency adjustment method of FIG. 15. The frequency adjustment method only allows a limited adjustment of the output voltage, whereas the phase cut method is able to provide output voltage adjustment from zero volts to the maximum determined by the turns ratio of the step-down transformer.

Sensing the Output with an Additional Winding

It is also possible to avoid using an optoisolator for sensing the output voltage, by adding an additional winding to the output transformer. This provides a very cheap method of obtaining an isolated feedback voltage, but is not able to provide a feedback voltage that is perfectly coupled with the secondary and therefore error is introduced.

It would be possible to use this sensing method with the circuit of either FIG. 15 or FIG. 16 and dispense with the optoisolator. This method can be accurate enough depending on the performance requirements of the design. It has the additional advantage that it can also be used to supply some power to drive VCC and therefore the charge pump can be removed and RS made larger.

Although the present invention has been described in relation to particular embodiments thereof, many other variations and modifications and other uses will become apparent to those skilled in the art. Therefore, the present invention is not limited by the specific disclosure herein.

What is claimed is:

1. A power supply circuit for powering a load, comprising:
   a half-bridge comprising a pair of high-side and low-side switching devices arranged in series between a high-side supply circuit and a common return circuit;
   a connection point between said switching devices providing a switched output for powering said load; and
   an integrated circuit, including a high-side driver and a low-side driver for respectively providing drive signals to control terminals of said high- and low-side switching devices, said high- and low-side drivers being controlled by an oscillator and timing and logic elements in the integrated circuit;
   said IC having a current sense pin connected to said half-bridge, said current sense pin receiving from said half-bridge a current signal representative of a current in said half-bridge, and said IC having an internal shut-down circuit operative to shut down said drive signals in response to said current signal indicating an overcurrent in said half-bridge;
   further comprising a dimming circuit connected to said current sense pin and having components for generating a waveform, setting a variable duty cycle of said waveform, and applying said waveform separately from said current signal from said half-bridge to said current sense pin of said IC, thereby to periodically shut down said IC independently of said current signal from said half-bridge so as to vary the duty cycle at said load.

2. A power supply circuit of claim 1, wherein said dimming circuit comprises a circuit which generates a ramp waveform, and a comparator which receives the ramp waveform and reduces its amplitude by comparison with a selected level, thereby reducing the amplitude of the waveform applied to said current sense pin.

3. A power supply circuit of claim 2, wherein said selected level is determined by a potentiometer.

4. A power supply circuit of claim 2, wherein said comparator is comprised in a microcontroller, the microcontroller being connectable to a digital bus for remote digital dimming of said load.

5. A power supply circuit of claim 1, wherein said waveform has a rising portion thereby providing trailing edge dimming at said load.

6. A power supply circuit of claim 1, wherein said dimming circuit comprises a microcontroller and a plurality of passive components, the microcontroller being connectable to a digital bus for remote digital dimming of said load.

7. A power supply circuit of claim 1, wherein said IC has a latched shutdown mode;
   further comprising a latched shutdown trigger circuit which responds to a short circuit condition at said switched output by placing said IC in said latched shutdown mode.

8. A power supply circuit of claim 7, wherein said latched shutdown mode is entered in response to a voltage above a given threshold applied to a current sense pin for a given time, and wherein said trigger circuit applies said given voltage to said current sense pin for said given time so that said IC enters said latched shutdown in response to a short circuit.

9. A power supply circuit of claim 7, further comprising a delay circuit for delaying said response of said latched shutdown trigger circuit.

10. A power supply circuit of claim 7, wherein said trigger circuit comprises:
    a triggerable device connected between a main IC voltage bus and a common bus; and
    a sensing circuit which delivers a trigger signal to said triggerable device in response to a short circuit;
    whereby a short circuit causes said triggerable device to pull down said IC bus voltage.

11. A power supply circuit of claim 10, wherein said triggerable device comprises an SCR and said sensing circuit senses an overcurrent in said half-bridge.

12. A power supply circuit of claim 11, further comprising a delay circuit for delaying said response of said latched shutdown trigger circuit.

13. A method of supplying power to a load, using
    a half-bridge comprising a pair of high-side and low-side switching devices arranged in series between a high-side supply circuit and a common return circuit;
    a connection point between said switching devices providing a switched output for powering said load; and an integrated circuit, including a high-side driver and a low-side driver for respectively providing drive signals to control terminals of said high- and low-side switching devices, said high- and low-side drivers being controlled by an oscillator and timing and logic elements in the integrated circuit;

said method comprising the steps of;

connecting a current sense pin of said IC to said half-bridge, thereby providing said current sense pin with a current signal from said half-bridge representative of a current in said half-bridge;

shutting down said drive signals in response to said current signal indicating an overcurrent in said half-bridge;

dimming said load by generating a waveform, setting a variable duty cycle of said waveform, and applying said waveform separately from said current signal from said half-bridge to said current sense pin of said IC, thereby to periodically shut down said IC independently of said current signal from said half-bridge so as to vary the duty cycle at said load.

14. The method of claim 13, comprising the steps of generating a ramp waveform, and reducing its amplitude by comparing the ramp waveform with respect to a selected level, thereby reducing the amplitude of the waveform applied to said current sense pin.

15. The method of claim 13, wherein said waveform has a rising portion so as to provide trailing edge dimming at said load.

16. The method of claim 13, wherein said IC has a latched shutdown mode;

said method comprising the step of responding to a short circuit condition by placing said IC in said latched shutdown mode.

17. The method of claim 16, wherein said latched shutdown mode is entered in response to a voltage above a given threshold applied to a current sense pin for a given time and wherein said trigger circuit applies said given voltage to said current sense pin for said given time so that said IC enters a latched shutdown in response to a short circuit.

18. The method of claim 16, further comprising a delay circuit for delaying said response of said latched shutdown trigger circuit.

19. The method of claim 16, wherein said trigger circuit comprises:

a triggerable device connected between a main IC voltage bus and a common bus; and a sensing circuit which delivers a trigger signal to said triggerable device in response to a short circuit;

whereby a short circuit causes said triggerable device to pull down said IC bus voltage.

20. The method of claim 19, wherein said triggerable device comprises an SCR and said sensing circuit senses an overcurrent in said half-bridge.

21. The method of claim 20, further comprising a delay circuit for delaying said response of said latched shutdown trigger circuit.

* * * * *